US008451800B2

(12) United States Patent
Kovvali et al.

(10) Patent No.: US 8,451,800 B2
(45) Date of Patent: May 28, 2013

(54) SESSION HANDOVER IN MOBILE-NETWORK CONTENT-DELIVERY DEVICES

(75) Inventors: Surya Kumar Kovvali, Westborough, MA (US); Ravi Valmikam, Westford, MA (US); Charles W. Boyle, Upton, MA (US); Christopher Leary, Amherst, MA (US)

(73) Assignee: Movik Networks, Inc., Westford, MA (US)

( * ) Notice: Subject to any disclaimer, the term of this patent is extended or adjusted under 35 U.S.C. 154(b) by 0 days.

(21) Appl. No.: 12/939,690

(22) Filed: Nov. 4, 2010

(65) Prior Publication Data

US 2011/0136488 A1 Jun. 9, 2011

Related U.S. Application Data

(63) Continuation-in-part of application No. 12/536,537, filed on Aug. 6, 2009, now Pat. No. 8,111,630.

(60) Provisional application No. 61/257,899, filed on Nov. 4, 2009.

(51) Int. Cl.
*H04Q 7/00* (2006.01)
*H04W 36/00* (2009.01)

(52) U.S. Cl.
USPC .......................................... 370/331; 455/436

(58) Field of Classification Search
None
See application file for complete search history.

(56) References Cited

U.S. PATENT DOCUMENTS

| | | | |
|---|---|---|---|
| 2004/0185876 A1* | 9/2004 | Groenendaal et al. | 455/456.5 |
| 2007/0275726 A1* | 11/2007 | Lee et al. | 455/436 |
| 2008/0031194 A1* | 2/2008 | Yaqub | 370/331 |
| 2009/0135749 A1* | 5/2009 | Yang | 370/310 |
| 2010/0054204 A1* | 3/2010 | Dolganow et al. | 370/331 |
| 2010/0091736 A1* | 4/2010 | Kim et al. | 370/331 |
| 2011/0110333 A1* | 5/2011 | Chen | 370/331 |

* cited by examiner

*Primary Examiner* — Andrew Lee
(74) *Attorney, Agent, or Firm* — Bingham McCutchen LLP

(57) ABSTRACT

An application mobility-management entity ("AME") in a radio-access network detects movement of a mobile device and routes application data for already-active application streams associated with the mobile device to the device's new location by establishing a connection to a second AME in the radio-access network. The second AME merges forwarded application data from/to the first AME for previously active application streams with the new application streams (e.g., new TCP connections) locally and forwards to/from the mobile device through the radio access network elements.

23 Claims, 10 Drawing Sheets

SESSION HANDOVER IN MOBILE-NETWORK CONTENT-DELIVERY DEVICES

CROSS-REFERENCE TO RELATED APPLICATIONS

This application is a continuation-in-part of, and claims priority to and the benefit of, co-pending U.S. patent application Ser. No. 12/536,537, filed on Aug. 6, 2009, and claims priority to and the benefit of U.S. Provisional Patent Application Ser. No. 61/257,899, filed on Nov. 4, 2009, the disclosures of which are hereby incorporated herein by reference in their entireties.

TECHNICAL FIELD

Embodiments of the invention generally relate to mobile networks and, in particular, to transferring service to a mobile device moving between mobile-network domains.

BACKGROUND

The increasing number of network-connected mobile devices, as well as the increasingly data-intensive applications run on these devices, continue to tax mobile-network infrastructure. As network bandwidth limits are reached, inefficiencies in network architectures and implementations become more apparent. One such inefficiency occurs when a mobile devices moves from a coverage area of a first base-transceiver station to a second; packets sent to or from the first base-transmitter station are dropped and must be re-sent using the second base-transmitter station.

In a prior-art general-packet radio service ("GPRS") system such as a universal mobile-telecommunication system ("UMTS"), a gateway GPRS service node ("GGSN") links a packet-switched network, such as the Internet, to the GPRS network. A serving GPRS support node ("SGSN") is disposed one level of hierarchy below the GGSN and delivers packets to and from radio-network controllers ("RNCs") in its geographical area. Each RNC controls one or more base-transceiver stations ("NodeB" stations). In such deployments, the mobile network operates as a transport network and is thus unaware of, for example, user-level TCP/UDP/IP sessions and application protocols above TCP/UDP.

FIG. 1 illustrates an example of a network 100 that includes a UMTS radio-access network ("RAN") and the Internet. A GGSN 102 within the RAN sends and receives content from a server 104 over the Internet 106. The RAN operates only as a transport network, and application sessions are therefore terminated outside the RAN (in, e.g., the Internet 106). When a mobile device 108 moves from a first position 110 to a second position 112, it leaves the coverage area of a first base-transmitter station 114 and enters the coverage area of a second base-transmitter station 116. RNCs 118, 120 use an inter-RNC logical connection 122 in accordance with industry-standard protocols to hand over control-plane and user-plane sessions to the new RNC 120 and new base-transmitter station 116. The hand-over in the user plane happens at the transport level, and any packets lost en route to or from the first base-transmitter station 114 via the first RNC 118 are re-transmitted to the mobile device 108 at its new position 112 using the second RNC 120 and the second base-transmitter station 116 (or other, similar recovery operations are performed).

In other examples, the common point in the network between the first position 110 and the second position 112 may be further "downstream" (e.g., if the two base-transmitter stations 114, 116 are managed by a common RNC 118) or farther "upstream" (e.g., if a first SGSN 120 or GGSN 102 manages the first base-transmitter station 114 and a second, different SGSN or GGSN manages the second base-transmitter station 116). Although packets are dropped in the system 100 during a base-transmitter transfer in each case, the higher upstream the common point, the more packets will be dropped and the greater the inefficiency of the transfer.

Existing Third-Generation Partnership Project ("3GPP") standards define different types of mobility and relocation operations when a mobile device moves from the coverage area of the first base-transmitter station 114 (e.g., a NodeB/RNC combination in an UMTS network or an eNodeB in a long-term evolution ("LTE") network) to the second base-transmitter station 116. These operations include intra-NodeB handover, inter-NodeB handover, and inter-RNC handover between two RNCs connected to the same or different SGSNs. The mobility and handover scenarios include soft handover, softer handover, and hard handover. The handover and relocation procedures in the prior-art 3GPP standards operate at the packet-transport level and do not, for example, terminate TCP or UDP sessions.

SUMMARY

In general, various aspects of the systems and methods described herein track data in a RAN at a per-user application (e.g., TCP/UDP) level and forward the buffered data to a new location when a mobile device moves from one area of a RAN to another. Such user-application-level tracking may use transit buffer, split-tcp, and/or content-caching mechanisms. Any application sessions running on the mobile device prior to this transition are preserved and handed over gracefully to the mobile device following the transition, thus reducing or eliminating dropped packets normally associated with such movement. If the RAN includes caches or buffers, any data therein is maintained even if the mobile device moves out of the domain of the cache or buffer; the stored data is routed to the new location of the mobile device, which ideally experiences no interruption or delay in service. In various embodiments, the tracked per-user application data includes data streams from a buffer, proxy, cache, and/or application server.

Accordingly, in a first aspect, a method of delivering content to a mobile device in a radio-access network as the mobile device moves from an area served by a first base station to an area served by a second base station includes identifying, in the radio-access network, a user application running on the mobile device. The user application receives a stream of application data routed to the mobile device via the first base station. Movement of the mobile device, from the first base station area to the second base station area, is detected. A connection is established, in the radio-access network, between a first application mobility-management entity ("AME") monitoring traffic to the first base station and a second AME monitoring traffic to the second base station. The stream of application data is routed over the connection to the mobile device via the second base station.

In various embodiments, identifying the user application includes recognizing per-user tunnels in the data routed to the mobile device and identifying user-application streams therein; in this embodiment, transport packets in the data routed to the first base station may be analyzed. Routing the stream of application data may be halted when an application using the application data closes. A second stream of data may be routed from a second application, after detecting movement of the mobile device, through the second base station. Data received from the mobile device may be routed over the connection.

Identifying the stream of application data may include snooping control-plane protocol traffic and/or user-plane protocol traffic in the radio-access network. Routing the stream of application data may include tunneling the stream of application data. A topology map identifying the first and second base stations may be constructed, and constructing the topology map may include determining an RNC-ID, a SGSN-ID, an eNodeB-ID, and/or an S-GW/MME-ID. The stream of application data may include data streams from at least one of a proxy, cache, and application server, and/or it may stream from a pipeline buffer. Detecting movement may include determining that the target of the movement is the area served by the second base station.

In general, in another aspect, a system for delivering content to a mobile device in a radio-access network as the mobile device moves from an area served by a first base station to an area served by a second base station includes identification, detection, connection, and routing modules. The identification module identifies, in the radio-access network, a user application running on the mobile device; the user application receives a stream of application data routed to the mobile device via the first base station. The detection module detects movement of the mobile device from the first base station area to the second base station area. The connection module establishes a connection, in the radio-access network, between a first application mobility-management entity (AME) monitoring traffic to the first base station and a second AME monitoring traffic to the second base station. The routing module routes the stream of application data over the connection to the mobile device via the second base station. In various embodiments, the system also includes a cache for caching application data; the stream of application data may be served from the cache. The connection may include a TCP, UDP, GRE, and/or GTP connection.

In general, in yet another aspect, an application mobility-management entity ("AME") device delivers content to a mobile device in a radio-access network as the mobile device moves from an area served by a first base station to an area served by a second base station. An input module receives traffic from a radio-access network. A processor analyzes the received traffic, identifies a user application running on the mobile device, determines an address of the second base station, and establishes a connection in the radio-access network to a second AME device in communication with the second base station. An output module for sending the content to the second AME device, the second AME device sending content related to the user application to the mobile device. In various embodiments, the received traffic includes control-plane data and/or user-plane data. The AME device may be configured to be disposed between one of a NodeB and an RNC, an RNC and a SGSN, a SGSN and a GGSN, an eNodeB and a S-GW/MME, and a S-GW/MME and a P-GW. The AME may be configured to be logically in-line between two network devices, and/or include a server, a rack-mount server, and/or a blade server. The AME may be configured for communication with a third AME device associated with a third base station, the AME device sending the content to the third AME device upon detecting the mobile device moving to an area served by the third base station.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
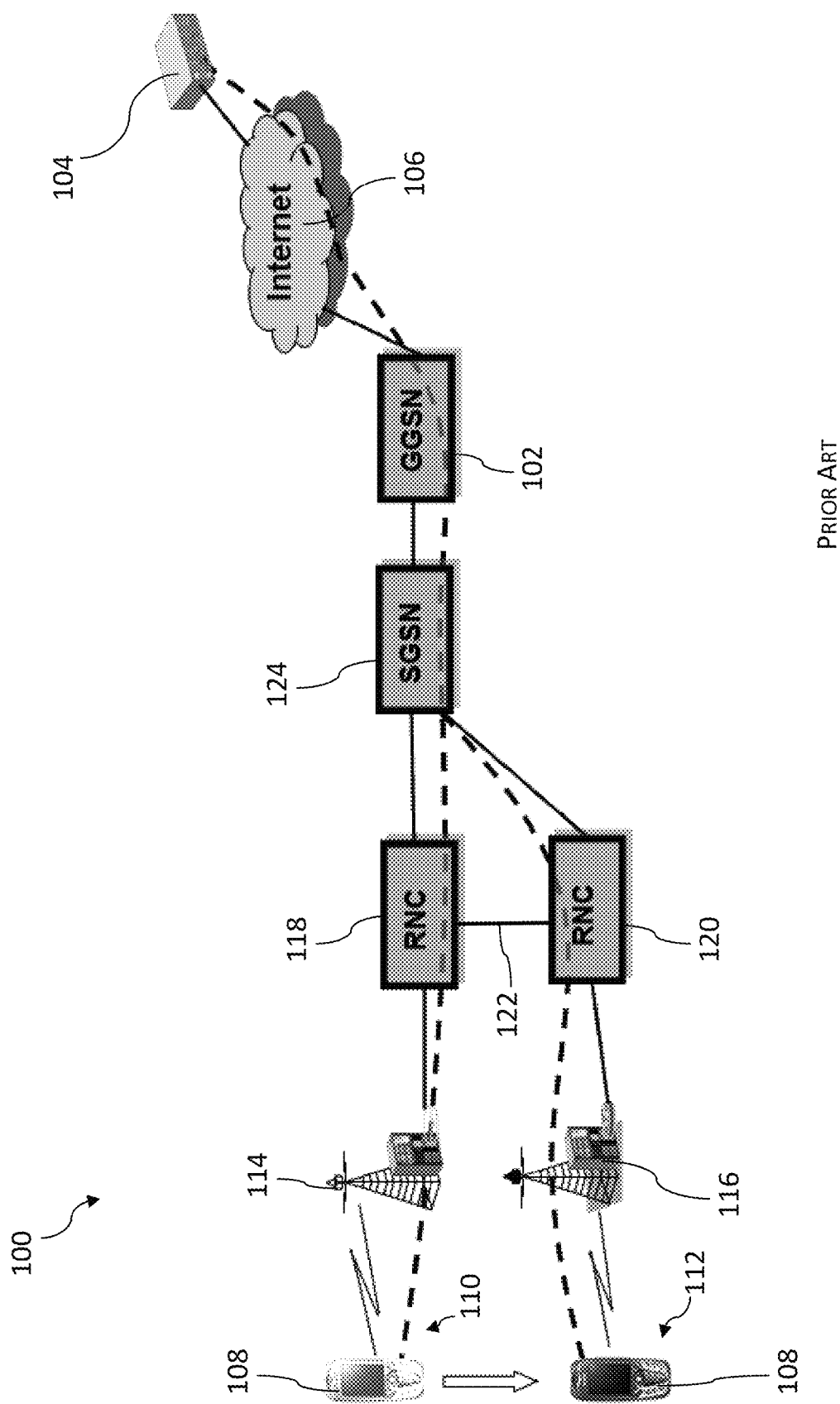
FIG. 1 is a block diagram of a network that includes the Internet and a prior-art RAN.
Figure 2:
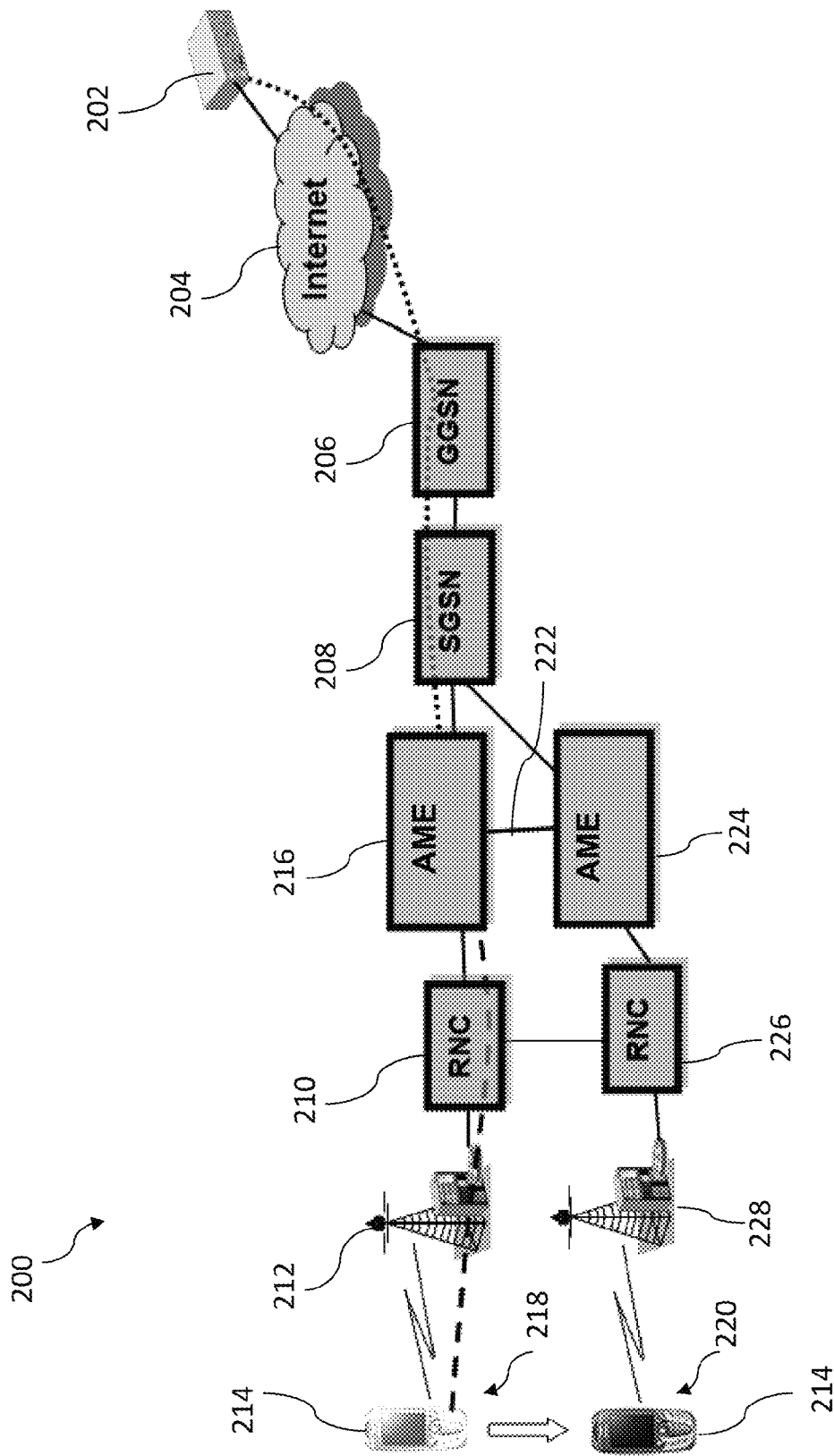
FIG. 2 is a block diagram of a network that includes the Internet and a UMTS RAN in accordance with an embodiment of the invention.

FIG. 2 illustrates a network 200 that includes a UMTS network and the Internet. A server 202 serves content over the Internet 204 to a GGSN 206 and through a SGSN 208. The content is routed to an RNC 210 and a base-transmitter station 212 to be delivered to a mobile device 214. Disposed between the SGSN 208 and the RNC 210 is an application mobility-management entity ("AME") 216. In general, as described in more detail below, the AME 216 examines traffic between the SGSN 208 and the RNC 210, identifies movement of the mobile device 214 from a first position 218 to a second position 220, and, if any streams of application data were being routed through the RNC 210 and base-transmitter station 212, re-routes the streams of data via an inter-AME link 222 to a second AME 224, a second RNC 226, and a second base-transmitter station 228. The AME 216 may be logically in-line between the SSGN 208 and RNC 210 and intercept user plane-protocols (e.g., IuPS/GTP-U packets) corresponding to the mobile device 214 and control-plane protocols (e.g., IuPS-CP packets) passing between the devices 208, 210, as described in more detail below.

In one embodiment, the AME 216 is a stand-alone device such as a stand-alone server, a rack-mount server, a blade server, a custom-designed appliance, or any other type of content-aware computing device capable of examining and routing network traffic. In other embodiments, the AME 216 is a software or firmware program running on a network device already existing in the network 200. For example, as explained in greater detail below, the AME 216 may be incorporated in to a RAN cache device, a traffic-offload device, or any other application proxy or content-edge device, or its functionality distributed among multiple such devices. In UMTS networks such as the network depicted in FIG. 2, the AME 216 may alternatively be located elsewhere in the RAN, such as between the base-transmitter station 212 and RNC 210 or between the SGSN 208 and GGSN 206.

The flow of relevant traffic between the Internet 204 and the mobile device 214 is defined as a set of one or more TCP and UDP connections that may be combined to deliver applications to the mobile device 214. An application is defined as any service that requires a flow-level anchor point. Examples of applications include web-browsing applications, file-transfer applications, and video-player applications, each using TCP/UDP/IP transport mechanisms. The set or grouping of TCP/UDP connections is based on application requirements and may be configured or dynamically negotiated between an application and the mobility management function. For example, in the case of an HTTP server, the grouping may include only one TCP connection. In the case of an RTSP streaming application, on the other hand, the grouping may include a TCP-based RTSP connection and an UDP-based RTP stream.

Figure 3:
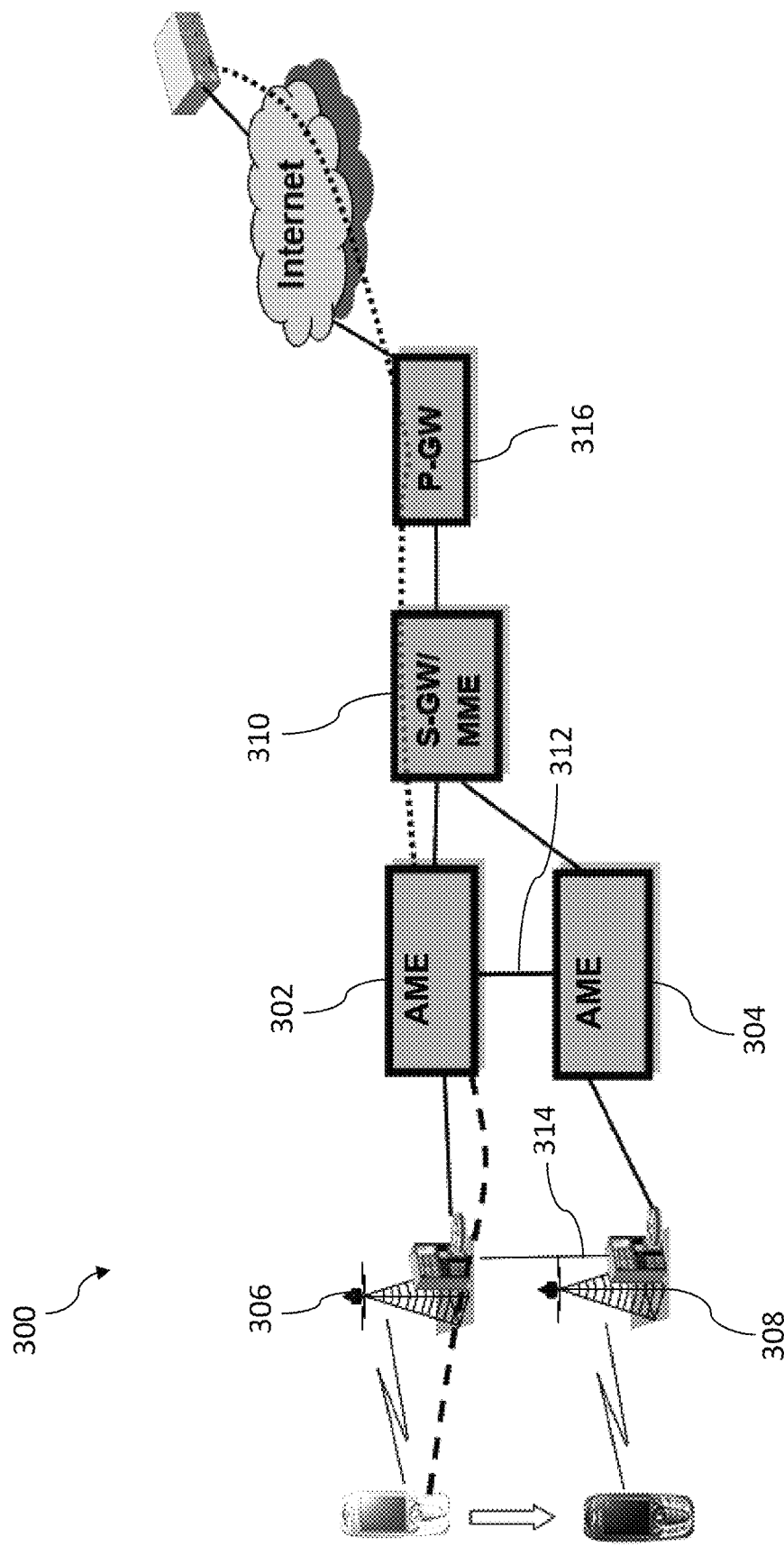
FIG. 3 is a block diagram of a network that includes the Internet and an LTE RAN in accordance with an embodiment of the invention.

FIG. 3 illustrates a network 300 that includes AMEs 302, 304 deployed in an LTE network (as opposed to the UMTS network illustrated in FIG. 2). The AMEs 302, 304 are disposed on an S1 interface between base-transceiver stations (i.e., eNodeBs) 306, 308 and serving gateway/mobility-management entity ("S-GW/MME") 310. The AMEs 302, 304 may intercept S1 user-plane protocols and/or S1 control-plane protocols and communicate session-handover information, in accordance with embodiments of the current invention, over the inter-AME connection 312. Note that an inter-eNodeB connection 314 may be used, in accordance with the LTE architecture, during inter-eNodeB handovers for transport level packet forwarding without user-application level knowledge. The AMEs 302, 304 behave similarly to the AMEs described above with reference to FIG. 2 and as described in more detail below. In one embodiment, the AMEs 302, 304 are disposed between the S-GW/MME 310 and a packet gateway ("P-GW") 316. In another embodiment, the AMEs 302, 304 may be incorporated into the eNodeBs 306, 308 or into the S-GW/MME 310. In general, AMEs may be used in any wireless network, and are not limited to only UMTS and LTE networks.

Identification and Mapping

Upon deployment and/or periodically during their use, each AME identifies the specific RAN in which it is located by intercepting and observing control-plane protocol packets (e.g., IuPS packets in an UMTS network or S1 packets in an LTE network). The AME may, for example, determine an RNC-ID and/or SGSN-ID for its particular RAN.

In greater detail and with reference to FIG. 2, during initialization, the RNCs 210, 226 and SGSN 208 communicate to exchange their RNC-IDs and SGSN-ID. Similarly, with reference to the LTE network illustrated in FIG. 3, the eNodeBs 306, 308 and S-GW/MME 310 communicate to exchange their eNodeB-IDs and MME-ID. In each case, the AMEs intercept the control-plane protocol packets used to convey this information (e.g., RANAP in UMTS and S1AP in LTE). Each AME identifies the RNC-ID or eNodeB-ID of its local RNC or eNodeB and associates the scope of the discovered interface with that RNC-ID or eNodeB-ID. For example, the first AME 216 of FIG. 2 associates the base-transmitter station 212, RNC 210, SGSN 208, and/or GGSN 206 with the RNC-ID of the RNC 210 and/or the SGSN-ID of the SGSN 208.

If the AME intercepts multiple IuPS or S1AP interfaces, it associates each RANAP/S1AP interface with the corresponding RNC-ID/S1AP-ID. Thus, in a network with multiple AMEs, in which each AME intercepts a plurality of RANAP/S1AP interfaces, each AME knows the RNC-ID/eNodeB-ID of each of the intercepted interfaces.

Once two or more AMEs have identified their locations, the AMEs may communicate with each other to build a topology map that incorporates the location information learned by each AME about its corresponding RAN(s) (for UMTS networks). In LTE networks, the topology map includes information about each AME's eNodeB(s) and S-GW/MME. The AMEs may use allocated TCP/UDP port numbers for inter-AME communication. Each AME may be statically configured with its own IP address, and the topology map may include the IP addresses of some or all of the AMEs in the network. In an alternative embodiment, the AMEs are dynamically assigned IP addresses using a discovery protocol and their allocated communicated parameters such as TCP/UDP port numbers. In this embodiment, when an AME associates itself with one or more RNCs or eNodeBs, it propagates the set of associated RNCs/eNodeBs to other AMEs. As a result of this step, each AME knows about other AMEs and the RNC-IDs/eNodeB-IDs with which they are associated. The AME-to-AME communication is not limited to TCP/UDP protocols, however, and any appropriate communications protocol, such as VLAN, MPLS, IPSec, GRE, and/or GTP may be used. Some protocols, such as GTP, may have less packet latency due to, for example, not requiring packet transformation.

In an alternative embodiment, the AME snoops user-plane protocols (instead of, or in addition to, control-plane protocols) to learn its associated RNC/eNodeB IP addresses. The AME may monitor the IuPS interface in a UMTS network or the S1 interface in an LTE network to determine this information. The user-data packets may be carried within GTP-U tunnels and contain transport addresses of a RNC, SGSN, and/or GGSN in the UMTS network or eNodeB and/or S-GW in the LTE network. Thus, in this embodiment, each AME associates itself with the set of transport IP addresses of a RNC or eNodeB for the corresponding interface. Like the above-described control-plane identification process, each AME may be configured with its own IP address and the map of IP addresses of the other AMEs in the RAN.

Tracking Applications

Once some or all of the AMEs in the RAN have been identified and mapped, each AME monitors the user-plane traffic flowing through or alongside it. Information such as client sessions, port numbers, TCP/UDP connection setup/tear-downs, and/or application context (for example, byte offset in an FTP transfer) may be gathered. Depending on the amount of traffic, an AME may monitor traffic for thousands of mobile devices. Each stream of application data is assigned to a mobile device; as described above, a single device may be the source or termination for multiple streams of application data (from one or more applications). Each AME may build a list of TCP and UDP ports that each application uses to communicate with a mobile device at any given point of time.

In greater detail, when a mobile device accesses the UMTS or LTE wireless mobile network, the mobile device first establishes a signaling connection (e.g., an Iu connection) to the SGSN (in UMTS networks) or MME (in LTE networks). This connection is established through an IuPS/RANAP logical interface in UMTS and an S1/S1AP logical interface in LTE. Thus, when the Iu signaling connection is established, the AME intercepting the control-plane protocols associates the mobile device with corresponding logical control-plane interface and the associated RNC or eNodeB.

Detecting Motion

As the mobile device moves from the scope of one AME location (the "serving AME") to the scope of another AME (the "drift AME") in a UMTS network, the serving AME snoops the RAN's control-plane traffic to derive the details of the movement from one RAN to another and to identify the drift AME using the topology map described above. In greater detail, in accordance with existing 3GPP standards, when a mobile device moves from the scope of one RNC (or from the scope of one eNodeB in an LTE network) to another, the RNC/eNodeB performs a handover procedure using an IuR/X2 interface. The serving RNC/eNodeB recognizes that the mobile device moved outside scope and that the mobile device is better serviced by moving the associated signaling connection and datapath bearers to the drift RNC/eNB. To move the mobile device permanently from the serving RNC/eNodeB to the drift RNC, the serving RNC initiates a RNC-relocation procedure, in accordance with the 3GPP standard. During this procedure, the serving RNC sends a "relocation required" message, containing the serving RNC-ID and drift RNC-ID information elements, to its SGSN. This "relocation required" message may be intercepted by an AME, which uses this information to identify the drift RNC-ID. Using the AME-to-RNC-ID associations described above, the serving AME identifies the IP address of the drift AME.

Detecting motion of a mobile device in an LTE network is similar to the procedure for detecting motion in a UMTS network, although the LTE interface protocols and corresponding messages differ. An AME in an LTE network associates its SLAP interfaces with corresponding eNodeB-IDs, and the AMEs communicate with each other to exchange eNodeB-to-AME associations. When a mobile device establishes a signaling connection to an MME through the eNodeB, the AME intercepting the SLAP messages identifies the information contained therein (e.g., the MME-UE-S1AP-ID, or ENB-UE-S1AP-ID) that corresponds to the mobile device and associates that with its eNodeB.

When a mobile device moves from the scope of a serving eNodeB to the scope of a drift eNodeB, the serving and drift eNodeBs and their governing MME transfer control from serving to drift using handover-signaling messages, as described in the 3GPP standards. The serving eNodeB sends a "hand-over-required" message, containing the drift eNodeB's ID information element, to the MME. The serving AME intercepts this eNodeB-to-MME message, identifies the drift eNodeB's ID, and identifies a drift AME using the eNodeB-ID-to-AME association described above.

Establishing an Inter-AME Connection

Once the drift AME is identified, the serving and drift AMEs set up a user-plane tunnel for transferring user-plane data packets therebetween. The AMEs may then use this tunnel to transfer user-plane data between the mobile device and the serving AME (in either direction) though the drift AME.

Figure 4:
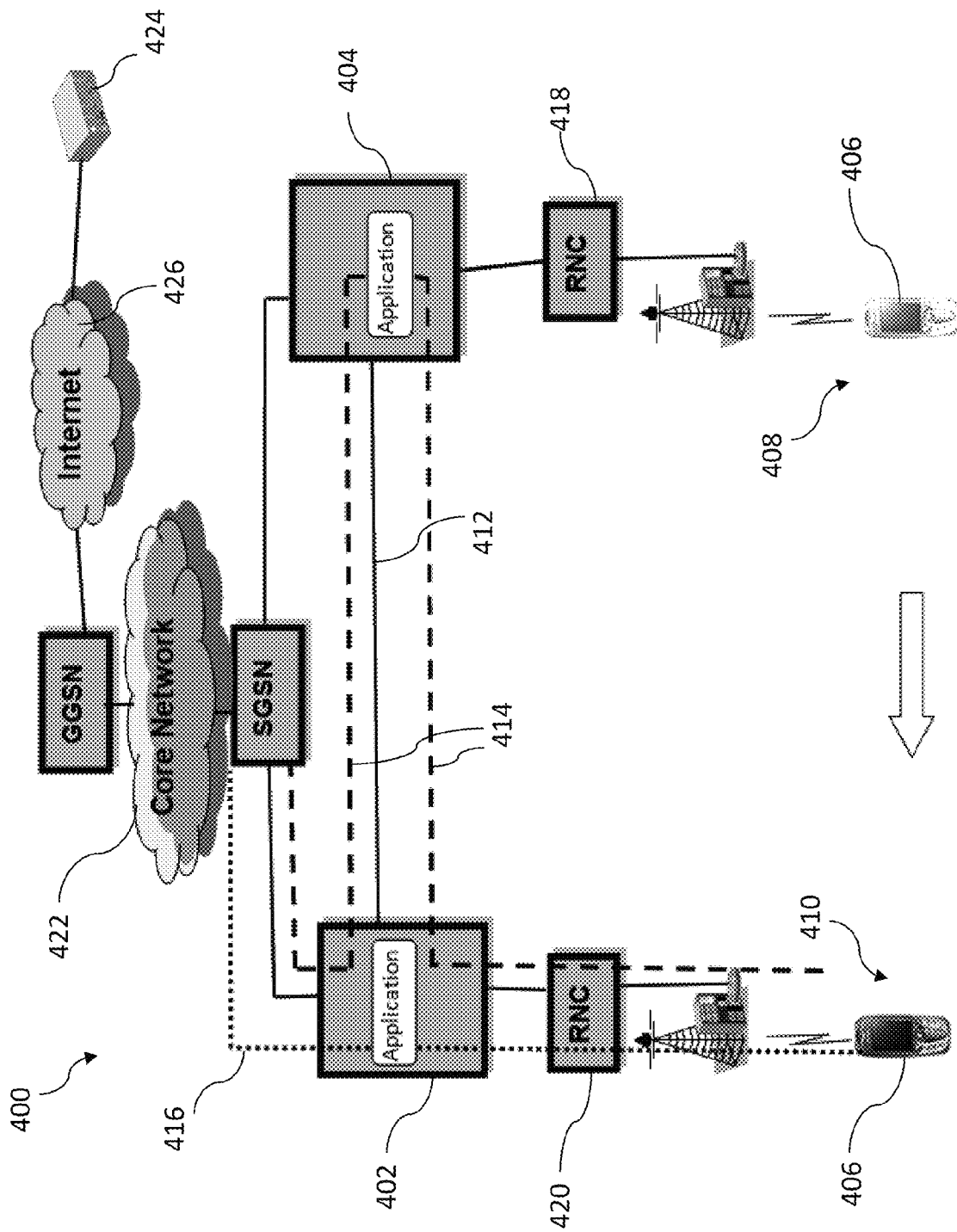
FIG. 4 is a block diagram illustrating re-direction of application data streams in a UMTS network in accordance with an embodiment of the invention.

FIG. 4 illustrates a UMTS network 400 that includes a serving AME 402 and a drift AME 404 that collaborate to route an application stream to a mobile device 406 after it moved from a first position 408 to a second position 410. Each AME 402, 404 may include an application entity. The two AMEs 402, 404 communicate over an interface 412, which may be a TCP, UDP, or any other type of connection. An existing application data stream 414, created while the mobile device 406 was in the first position 408, is routed over the inter-AME connection 412. A new application data stream 416, created after the mobile device 406 has moved to the new position 410, is routed directly through the drift AME 402.

In greater detail, when the mobile device 406 moves from the first position 408 (i.e., within the scope of a first RNC 418) to the second position 410 (i.e., within the scope of a second RNC 420), the RNC transport address changes accordingly. When a new user-plane tunnel is detected by the drift AME 402, it checks the neighboring AME 404, in accordance with its local configuration, for previously active TCP/UDP application data flows. If such data flows exist, the drift AME 402 establishes the user-plane tunnel 414 for exchanging the user-data packets.

Figure 5:
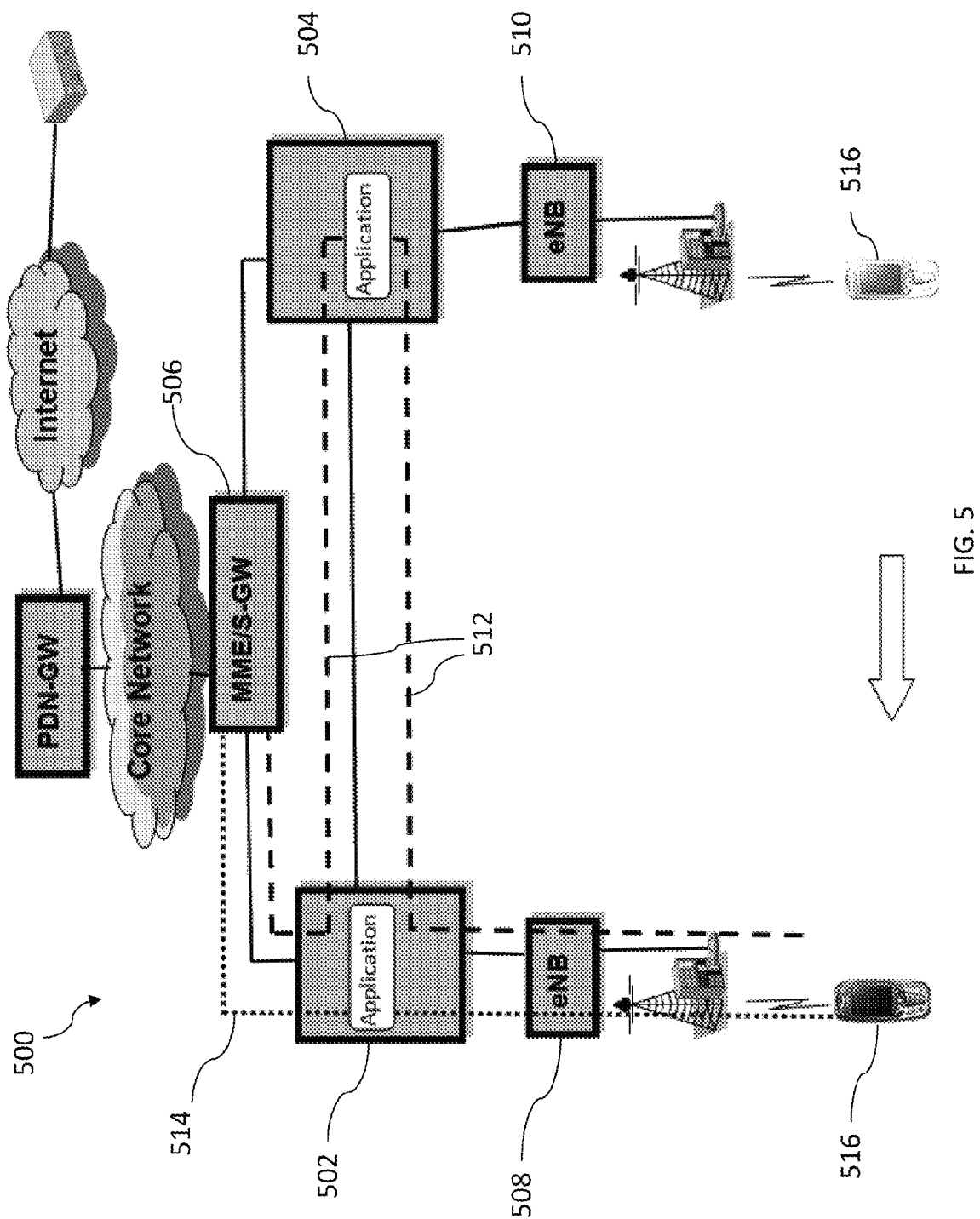
FIG. 5 is a block diagram illustrating re-direction of application data streams in an LTE network in accordance with an embodiment of the invention.

FIG. 5 is an LTE implementation 500 of the AMEs described above. A serving AME 502 and a drift AME 504 are placed on the S1 logical interface (and employ S1-AP control-plane and S1 user-plane protocols) between an MME/S-GW 506 and eNodeBs 508, 510. The drift AME 502 identifies a "path-switch request message" sent by the target eNodeB 508 to the MME/S-GW 506 and communicates with the source AME 504 to start the forwarding of mobile-device data between the source AME 504 and the mobile device 516 through the drift AME 502 for already-active TCP/UDP sessions. A previously active application flow 512 is forwarded by the serving AME 504 through the drift AME 502. A newly started application session 514 is serviced directly by the drift AME 502.

Sending Data Over the Connection

Referring again to FIG. 4, the serving AME 404 informs the drift AME 402 of all the existing flows and all the TCP and UDP connections used by each flow that correspond to applications used by the mobile device 406. The serving AME 404 transfers previously active session packets to/from the mobile device 406 through the drift AME 402 until the old TCP/UDP sessions (e.g., the session 414) are closed. Sessions may close when, for example, data in a cache or buffer (e.g., a pipeline buffer) associated with the source AME 404 is exhausted or when the application requesting the flows is terminated.

Because the drift AME 402 has direct contact with the mobile device 406 device after it has moved to the new position 410, the drift AME 402 forwards all the up-link packets received from the mobile device 406 that belong to the existing flows 414 to the serving AME 404. The drift AME 402 forwards all other packets (e.g., packets related to the setup of new TCP/UDP sessions and/or DNS Requests) to either local applications (e.g., local-application proxies) or to the core network 422. Thus, the drift AME 402 filters out previously established flows and sends them to the serving AME 404 and treats all other flows as it normally would. Newly started application flows (e.g., new TCP connections and/or DNS requests) that are not explicitly specified by the serving AME 404 are processed locally, without co-ordination with the serving AME 404.

In greater detail, the serving AME 404 forwards all the packets received from the drift AME 402 to a local application function and forwards all the packets received from the local application function to the drift AME 402. The drift AME 402 transfers packets received from serving AME 404 either to the RNC 420 for delivery to the mobile device 406 or to the core network 422 to deliver to, e.g., servers 424 over the Internet 426. The drift 402 and serving 404 AMEs may also keep track of termination of some or all the TCP/UDP connections 412, 414 by intercepting user-plane traffic. When these connections terminate, the drift AME 402 stops forwarding packets associated with these flows to the serving AME 404.

If the mobile device 406 moves again from the current drift location 410 to a third location, the former target AME 402 sends the set of flows 414 handled by the serving AME 404 to the new target AME. The former target AME 402 may also send the set of flows 416 handled by the former target AME 402 to the new target AME. In general, the new target AME takes over all the responsibility of the former target AME 402 and forwards packets to (and receives packets from) the serving AME 404. If the mobile device 406 started new application flows while at the first drifting location 410, the new target AME forwards traffic associated with those flows to the former target AME 402 (i.e., the former target AME 402 acts like a serving AME for these flows). When the mobile device 406 logs out of the network, the current target AME notifies the rest of AMEs in the network, and all the AMEs clear their internal states with respect to the mobile device 406.

Figure 6:
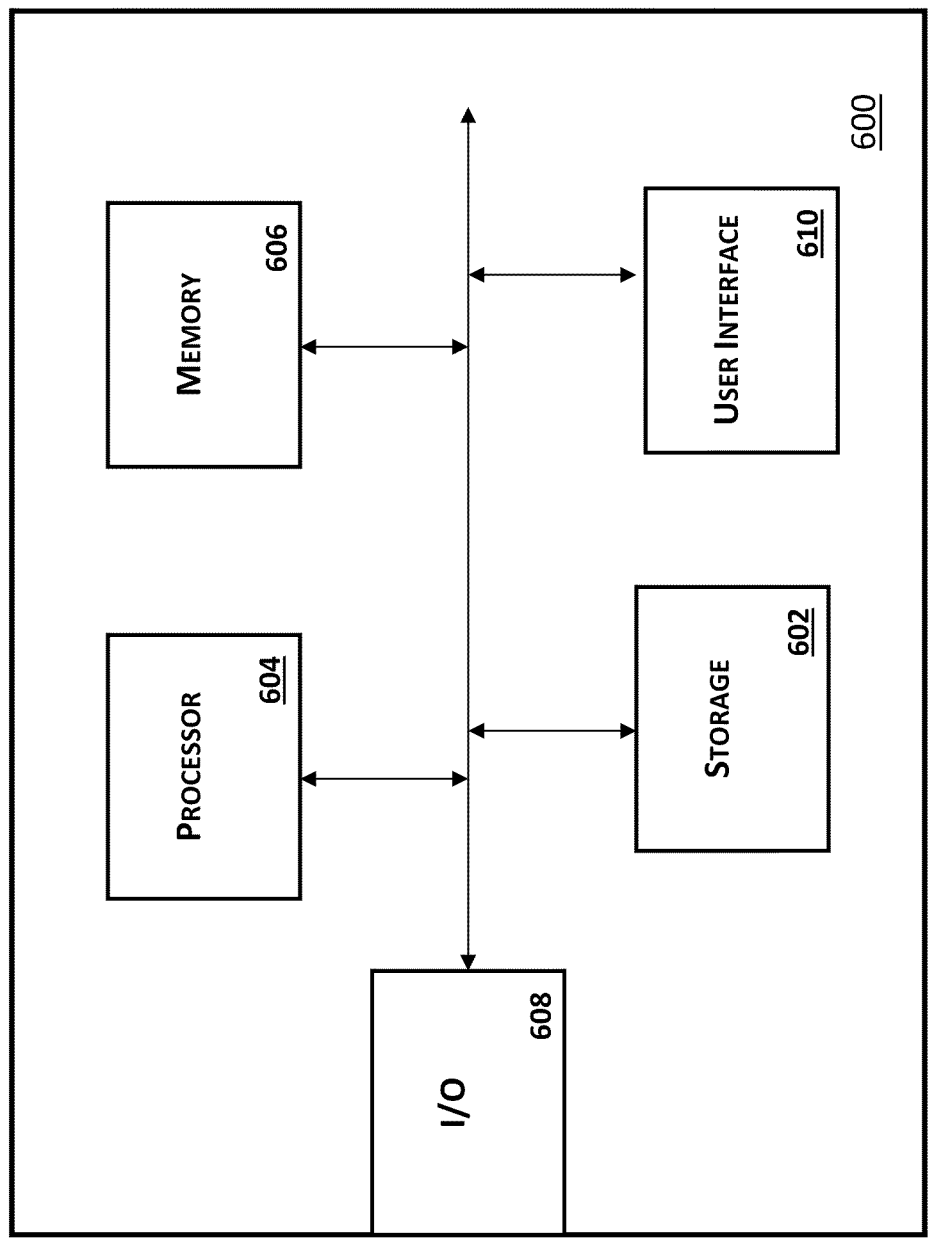
FIG. 6 is a block diagram of a device implementing an application mobility-management entity in accordance with an embodiment of the invention.

FIG. 6 is a block diagram of a representative device 600 implementing an AME. As described above, the AME 600 may be any appropriate network device or appliance, such as a server, rack-mount server, blade server, or edge server. Instructions for operating the AME 600 are stored in a storage device 602, which may be a magnetic disk, optical disk, solid-state drive, flash memory, or any other storage medium. A processor 604 executes the instructions and stores instructions and data in memory 606. An input/output interface module 608 communicates with other devices in a RAN in accordance with their appropriate communications protocols (e.g., IuB, IuPC, or Gn for a UMTS network or S1 or S5 for an LTE network) and with the internal components of the device 600 via a bidirectional bus. The input/output module 608 may observe RAN traffic passively (e.g., by observing it at a tap point in the RAN network) or may be inserted inline within the RAN network (and receive input RAN traffic, decode and re-encode it, and output the examined RAN traffic back into the RAN network). The AME 600 may be controlled remotely via the input/output interface 608 or locally via a user interface 610.

Figure 7:
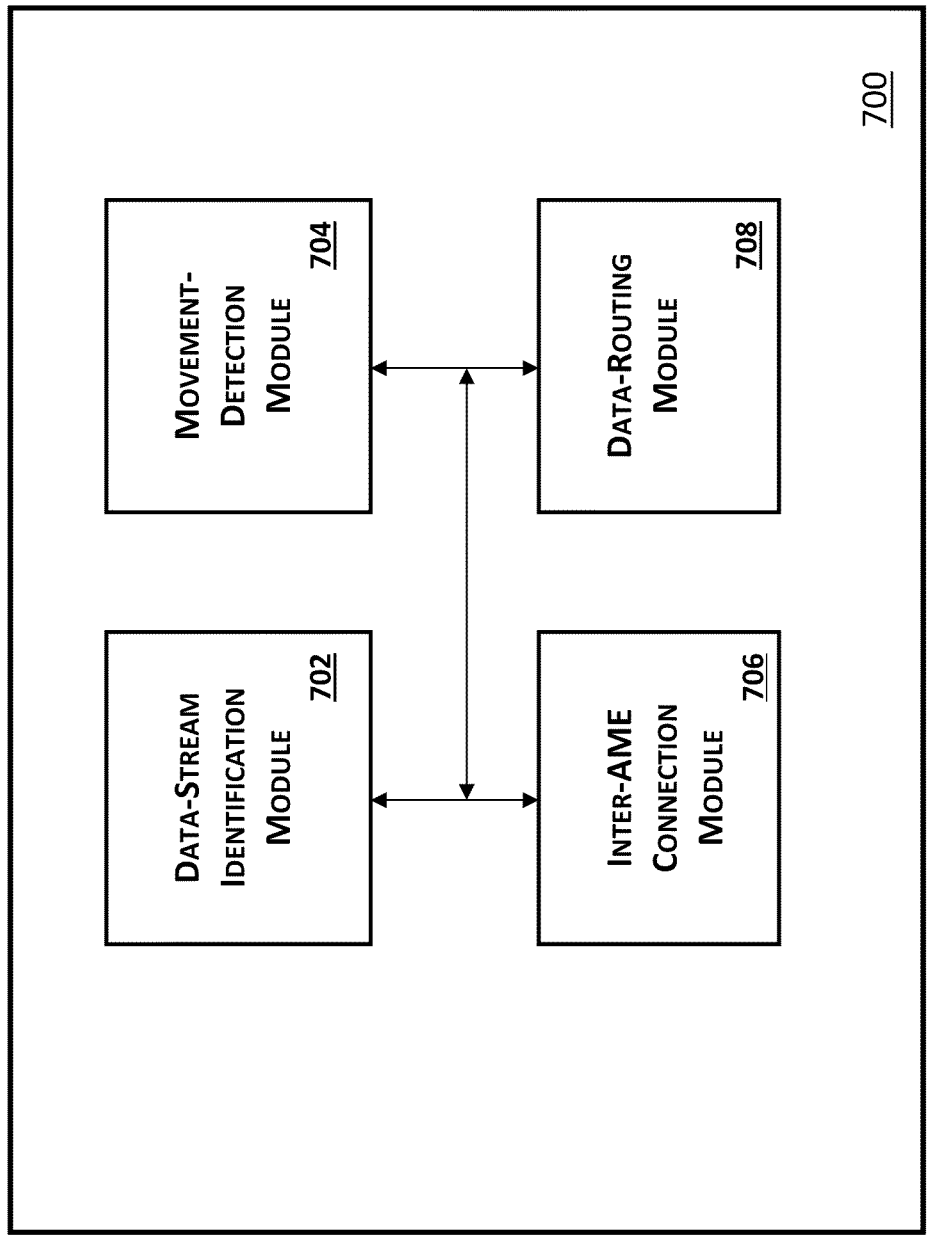
FIG. 7 is a block diagram of an application mobility-management entity in accordance with an embodiment of the invention.

The functionality of an AME may be implemented in software; FIG. 7 is a block diagram illustrating software modules of an AME 700. A data-stream identification module 702 monitors data moving in a RAN network, identifies streams of data, and associates streams of data with individual originating and receiving mobile devices. A mobile device may have one or more streams of data associated with it. As described above, a RAN may include many AMEs, and each AME identifies streams of data associated with its part of the RAN.

A movement-detection module 704 detects movement of a mobile device from one part of the RAN to another (e.g., movement from a first base-transmitter station or RNC to a second base-transmitter station or RNC, as described above). An RNC or eNodeB, as described above, sends detected movement information in accordance with 3GPP standards, and the movement-detection module 704 intercepts this traffic and extracts the movement information. The mobile device's beginning and ending locations are thus determined.

An inter-AME connection module 706 establishes a TCP/UDP connection between a serving AME and a drift AME. The connection may include a direct link between the two AMEs or may include a more circuitous path passing through other network components. In that case, the inter-AME connection module 706 may create a logical link between the two AMEs that abstracts away details of the physical link and behaves as if the link were a direct one. A data-routing module 708 routes existing streams of data between a drift AME and a serving AME in accordance with embodiments of the invention.

Figure 8:
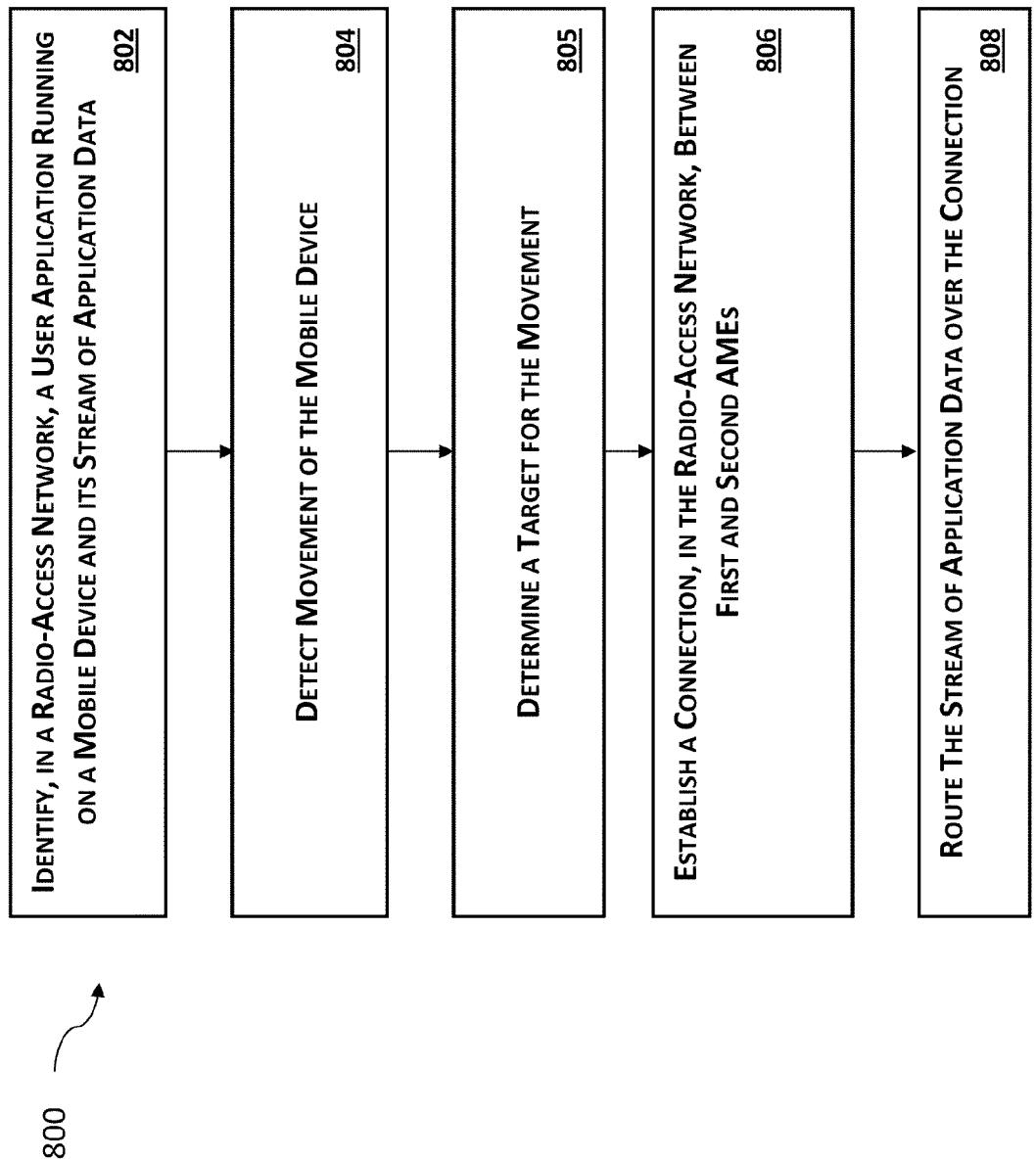
FIG. 8 is a flowchart illustrating a session handover process in accordance with an embodiment of the invention.

The operation of the AME 600, 700 is shown in FIG. 8, which illustrates a method 800 for delivering content to a mobile device in a radio-access network as the mobile device moves from an area served by a first base station (e.g., the scope of a first RNC in a UMTS network) to an area served by a second base station (e.g., the scope of a second RNC in the UMTS network). In a first step 802, a stream of application data routed to the mobile device via the first base station is identified in the radio-access network. The stream of application data is identified with a user application running on the mobile device. In other words, embodiments of the present invention identify application data at the TCP/UDP level by, for example, recognizing per-user tunnels in the data routed to the mobile device and tracking which per-user tunnels are associated with each device and application. In one embodiment, transport packets routed to the mobile device (via, for example, a base-transmitter station) are analyzed to obtain this information. In a second step 804, movement of the mobile device from an area served by the first base station to an area served by the second base station the second base station is detected. The detection of the movement may include determining a destination or target of the movement (Step 805). In a third step 806, a connection in the radio-access network is established between a first logical or physical device (e.g., a first AME) disposed within a first portion of the radio-access network serving the first base station and a second logical or physical device (e.g., a second AME) disposed within a second portion of the radio-access network serving the second base station. In a fourth step 808, the stream of application data is routed over the connection to the mobile device via the second base station.

AMEs and RAN Caches/Buffers

Edge or application devices may be used to cache content and/or to act as proxies for content (as, e.g., a web proxy). These devices may be deployed within the RAN to cache content and/or act as proxies between two network elements in the RAN. This RAN Cache ("RANC") delivers locally cached content and/or terminates a client-side application session and uses a different session for communication with the home server. An AME, as described above, may be used to identify and re-route content being served from a RANC as a mobile device travels from the scope of one RAN (i.e., from a first RNC) to the scope of another RAN (i.e., to a second RNC). For example, a RANC may be disposed proximate a first AME, which monitors traffic between the RANC and a mobile device. The mobile device may move away from the portion of the RAN monitored by the first AME to a new portion monitored by a second AME. The first and second AMEs may then establish a connection between them, as described above, to transport the data in the RANC to the new location of the mobile device. Thus, using embodiments of the current invention, data cached in a RANC may be preserved during a movement of a mobile device instead of flushed.

Figure 9:
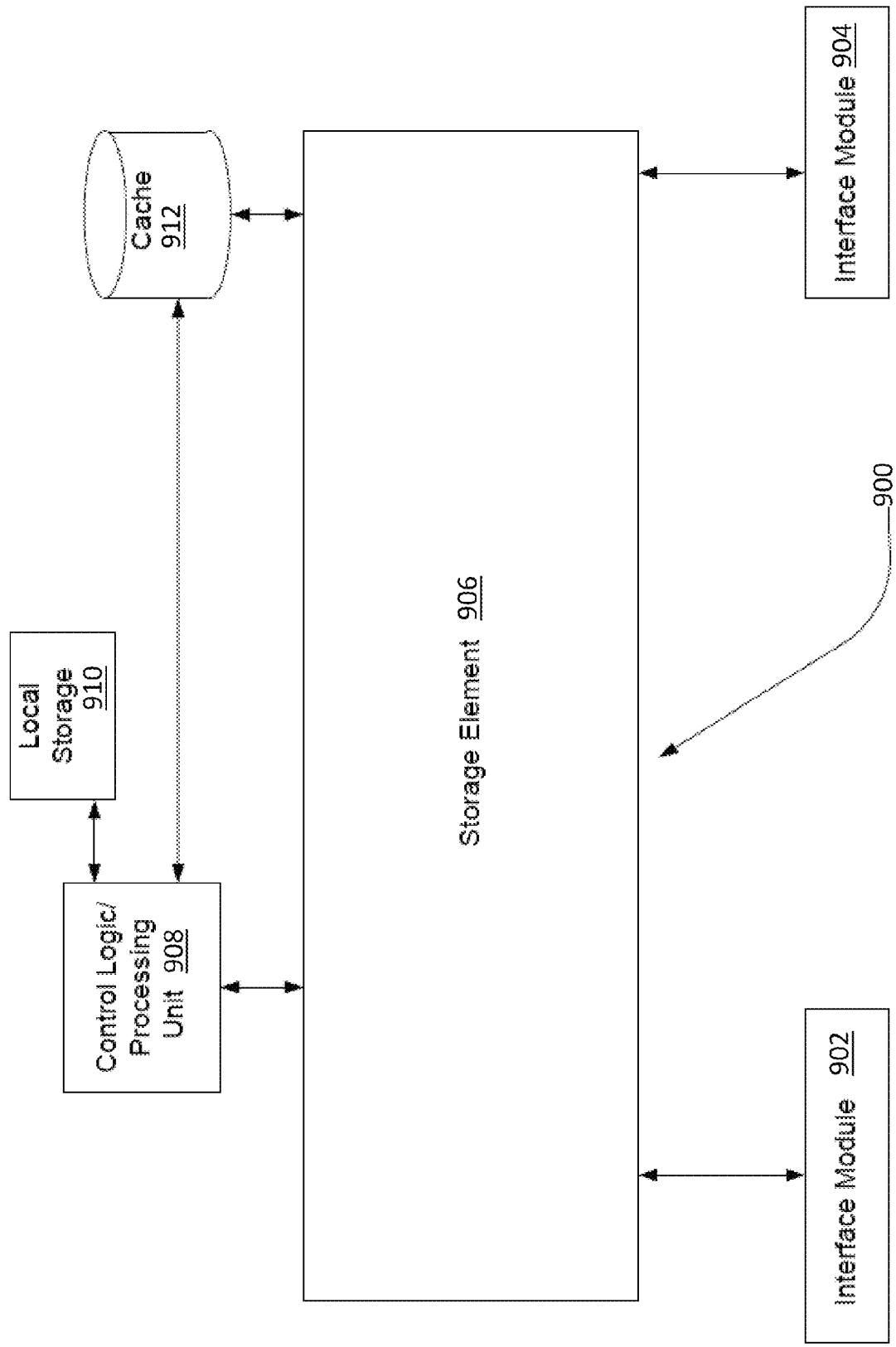
FIG. 9 is a block diagram of a RAN cache in accordance with an embodiment of the invention.

FIG. 9 is block diagram of one embodiment of a RANC 900. The RANC 900 includes two interface modules 902, 904, for the hardware signaling required to communicate with other devices in the RAN using an appropriate interface and software protocol (e.g., IuB, IuPS, or Gn). Each interface module 902, 904 may receive and/or transmit data on the selected interface. Received data may be placed into a storage element 906. The movement of data between the interface modules 902, 904 and the storage element 906 may involve dedicated hardware, such as a DMA controller, or a dedicated data-movement processor. The processing of control-plane and user-plane tunnels within the RANC 900, on the interfaces that connect to RAN devices, is in accordance with the RAN specifications. The processing of application protocols within these user-plane tunnels is per the application proxy, caching, etc. policies with the RANC device. This data processing may be accomplished using dedicated control logic or a processing unit 908. The control logic/processing unit 908 may have its own local storage element 910, which contains instructions to execute and store local status. Using known specifications and protocols, the control logic/processing unit 908 parses the received information to understand received packets at each protocol layer. A cache storage element 912 may also be included for holding cached information.

The storage element 906, local storage 910, and cache 912 may be implemented with any appropriate storage technology known in the art, such as random-access memory, flash memory, or a block storage device (e.g., a magnetic or solid-state disk). The control logic/processing unit 908 may be a general-purpose processor and executing a set of instructions from an internal or external storage device. In other embodiments, the control logic/processing unit 908 is a dedicated hardware device having embedded instructions or a state machine.

Figure 10:
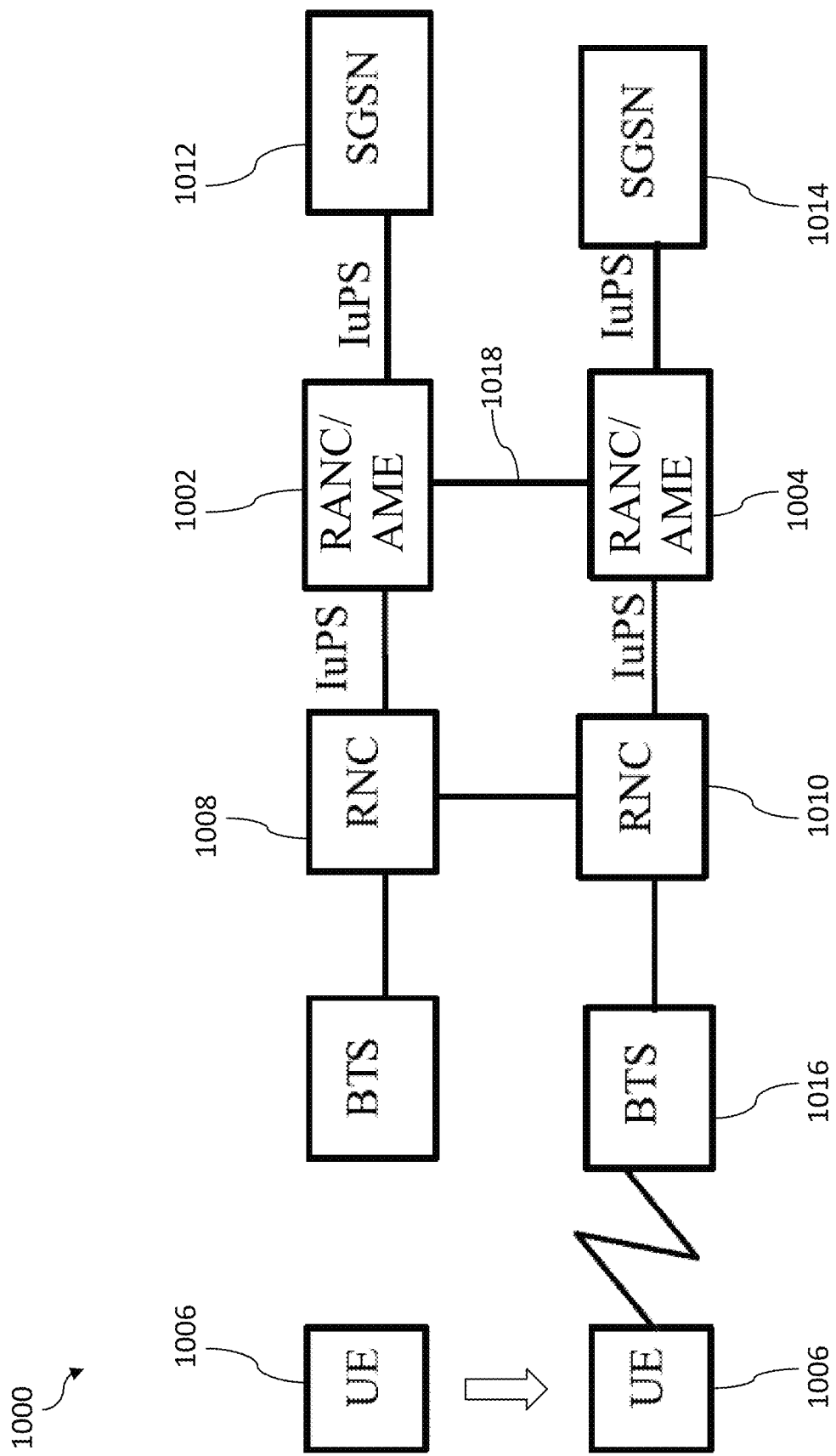
FIG. 10 is a block diagram of a network that includes a RAN cache and an application mobility-management entity.

FIG. 10 illustrates a network 1000 that includes RANCs 1002, 1004. The RANCs 1002, 1004 may include AMEs for handling mobility of a mobile device 1006 from the scope of one RNC 1008 to another RNC 1010. As described above, 3GPP standards define mobility and handover operations for handling mobility within one SGSN 1012 or across two different SGSNs 1012, 1014. The 3GPP standard protocols define relocation procedures by which the first RNC 1008 moves an active session of a UE to the second RNC 1010. The RANC/AME 1002 becomes the serving RANC/AME and the RANC/AME 1004 becomes the drift RANC/AME. The serving RANC/AME 1002 recognizes the mobile-device relocation and provides TCP/UDP-level application forwarding to the drift RANC/AME 1004 for the content cached therein. The serving RANC/AME 1002 may initiate context handover for some or all of the content that it is serving from its local cache. Any traffic that passes through the serving RANC/AME 1002 is re-configured to pass through the target RANC/AME 1004.

For supporting mobility, each RANC/AME communicates with its neighboring RANC/AME(s). Each RANC/AME maintains the identification of RNC to which it is connected as well as list of RANCs and the RNCs to which the first RNC is connected. While monitoring the IuPS control protocol as described earlier, the serving RANC/AME 1002 recognizes a relocation request and the identification of the target RNC 1010. It determines the drift RANC/AME 1004 that connects to target RNC 1010 and initiates a context transfer with the drift RANC/AME 1004. The source RANC/AME 1002 handles relocation of the mobile device 1006 for which it is performing content-aware operations to the target RANC/AME 1004 by two basic operations. First, the current RANC/AME 1002 transfers the mobile-device context, including user subscription, GTP-U tunnel information, and other information, to the drift RANC/AME 1004. Second, for an ongoing transfer (of, for example, active TCP traffic), the serving RANC/AME 1002 continues to send and receive traffic from the mobile device 1006 through its new coverage area (i.e., through a new base-transmitter station 1016) through the drift RANC/AME 1004 using the inter-RANC/AME link 1018. In the uplink direction (i.e., traffic received from the mobile device 1006), the drift RANC/AME 1004 identifies traffic for new flows (e.g., new TCP connections, DNS requests, and/or UDP Requests) as opposed to the traffic for previously active flows (e.g., TCP ACKs or RTP retransmission requests). The drift RANC/AME 1004 forwards the packets for already-active flows to the serving RANC/AME 1002 and processes traffic for new flows locally. In the downlink direction (i.e., traffic to the mobile device 1006), the drift RANC/AME 1004 receives downlink packets for already-active flows from the serving RANC/AME 1002 and handles traffic for new flows locally. Thus the serving RANC/AME 1002 continues to supply cached content, or any other TCP/UDP data, for active flows. This step also includes the drift RANC/AME 1004 recognizing new flows from the mobile device 1006, anchoring them, and at the same time, forwarding already-active flows through the serving RANC/AME 1002.

It should also be noted that the various hardware-based implementations described above are illustrative only. Embodiments of the present invention may be provided as one or more computer programs embodied on or in one or more articles of manufacture. The article of manufacture may be any suitable computer-readable medium, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture. Moreover, the computer programs may be distributed over various intercommunicating hardware elements (e.g., network nodes in a radio-access network).

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method of delivering content to a mobile device in a radio-access network as the mobile device moves from an area served by a first base station to an area served by a second base station, the method comprising:
   identifying, in the radio-access network, a user application running on the mobile device, the user application receiving a stream of application data routed from a first application mobility-management entity ("AME") located within the radio-access network to the mobile device via the first base station;
   detecting movement of the mobile device from the first base station area to the second base station area;
   establishing a connection, in the radio-access network, between the first AME that monitors traffic to the first base station and a second AME located in the radio-access network and that monitors traffic to the second base station; and
   routing the stream of application data over the connection to the mobile device via the second base station.

2. The method of claim 1, wherein identifying the user application comprises recognizing per-user tunnels in the data routed to the mobile device and identifying user-application streams therein.

3. The method of claim 2, further comprising analyzing transport packets in the data routed to the first base station.

4. The method of claim 1, further comprising halting routing the stream of application data when an application using the application data closes.

5. The method of claim 1, further comprising routing a second stream of data from a second application, after detecting movement of the mobile device, through the second base station.

6. The method of claim 1, further comprising routing data received from the mobile device over the connection.

7. The method of claim 1, wherein identifying the stream of application data comprises snooping at least one of control-plane protocol traffic and user-plane protocol traffic in the radio-access network.

8. The method of claim 1, wherein routing the stream of application data comprises tunneling the stream of application data.

9. The method of claim 1, further comprising constructing a topology map identifying the first and second base stations.

10. The method of claim 9, wherein constructing the topology map comprises determining one of an RNC-ID, a SGSN-ID, an eNodeB-ID, and an S-GW/MME-ID.

11. The method of claim 1, wherein the stream of application data comprises data streams from at least one of a proxy, cache, and application server.

12. The method of claim 1, wherein the stream of application data streams from a pipeline buffer.

13. The method of claim 1, wherein detecting movement comprises determining that the target of the movement is the area served by the second base station.

14. A system for delivering content to a mobile device in a radio-access network as the mobile device moves from an area served by a first base station to an area served by a second base station, the system comprising:
   an identification module for identifying, in the radio-access network, a user application running on the mobile device, the user application receiving a stream of application data routed from a first application mobility-management entity ("AME") located within the radio-access network to the mobile device via the first base station;
   a detection module for detecting movement of the mobile device from the first base station area to the second base station area;
   a connection module for establishing a connection, in the radio-access network, between the first AME that monitors traffic to the first base station and a second AME located in the radio-access network and that monitors traffic to the second base station; and
   a routing module for routing the stream of application data over the connection to the mobile device via the second base station.

15. The system of claim 14, further comprising a cache for caching application data.

16. The system of claim 15, wherein the stream of application data is served from the cache.

17. The system of claim 14, wherein the connection comprises at least one of a TCP, UDP, GRE, and GTP connection.

18. An application mobility-management entity ("AME") device for delivering content to a mobile device in a radio-access network as the mobile device moves from an area served by a first base station to an area served by a second base station, the AME device comprising:
   an input module for receiving traffic from a radio-access network;
   a processor for analyzing the received traffic, identifying a user application running on the mobile device, determining an address of the second base station, and establishing a connection in the radio-access network to a second AME device in communication with the second base station; and
   an output module for sending the content to the second AME device, the second AME device sending content related to the user application to the mobile device.

19. The system of claim 18, wherein the received traffic comprises at least one of control-plane data and user-plane data.

20. The system of claim 18, wherein the AME device is configured to be disposed between at least one of a NodeB and an RNC, an RNC and a SGSN, a SGSN and a GGSN, an eNodeB and a S-GW/MME, and a S-GW/MME and a P-GW.

21. The system of claim 20, wherein the AME is configured to be logically in-line between two network devices.

22. The system of claim 18, wherein the AME device comprises at least one of a server, a rack-mount server, and a blade server.

23. The system of claim 18, wherein the AME is configured for communication with a third AME device associated with a third base station, the AME device sending the content to the third AME device upon detecting the mobile device moving to an area served by the third base station.

* * * * *